US012626542B2

(12) United States Patent
Shinohara et al.

(10) Patent No.: US 12,626,542 B2
(45) **Date of Patent: *May 12, 2026**

(54) DATA PROCESSING APPARATUS AND NON-TRANSITORY RECORDING MEDIUM

(71) Applicant: SUBARU CORPORATION, Tokyo (JP)

(72) Inventors: Takeru Shinohara, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 146 days.

This patent is subject to a terminal disclaimer.

(21) Appl. No.: 18/603,737

(22) Filed: Mar. 13, 2024

(65) Prior Publication Data

US 2024/0221438 A1 Jul. 4, 2024

Related U.S. Application Data

(63) Continuation of application No. PCT/JP2022/037009, filed on Oct. 3, 2022.

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC ........... G07C 5/008; G07C 5/085; G08G 1/00
See application file for complete search history.

(56) References Cited

U.S. PATENT DOCUMENTS

| | | | | |
|---|---|---|---|---|
| 12,299,359 B1 * | 5/2025 | Semple | .................... | G06F 30/20 |
| 2017/0073064 A1 * | 3/2017 | Isom | .................... | G01M 5/0016 |

(Continued)

FOREIGN PATENT DOCUMENTS

| | | |
|---|---|---|
| JP | 2011-076240 A | 4/2011 |
| JP | 2018-010636 A | 1/2018 |
| JP | 6825634 B2 | 2/2021 |

OTHER PUBLICATIONS

International Search Report received in PCT Application No. PCT/JP2022/037009, dated Dec. 20, 2022.

(Continued)

*Primary Examiner* — Anne Marie Antonucci
*Assistant Examiner* — Patrick Daniel Mohl
(74) *Attorney, Agent, or Firm* — Rimon P.C.

(57) ABSTRACT

A data processing apparatus includes one or more processors, and one or more recording media including a program to be executed by the one or more processors stored therein. The program includes one or more commands that cause the one or more processors to execute: a simulation process of performing, based on driving operation data of a vehicle, a simulation of a vehicle behavior of the vehicle using vehicle models having different parameter settings; and a model identifying process of identifying one or more of the vehicle models that satisfy a predetermined similarity condition by evaluating a similarity of a vehicle behavior of each of the vehicle models to be obtained in the simulation process with a target vehicle behavior. Evaluating the similarity in the model identifying process is based on respective time waveforms of the vehicle behavior obtained in the simulation process and the target vehicle behavior.

9 Claims, 5 Drawing Sheets

(56) References Cited

U.S. PATENT DOCUMENTS

| | | | | |
|---|---|---|---|---|
| 2017/0168500 | A1* | 6/2017 | Bradley | G01C 21/3822 |
| 2018/0017467 | A1 | 1/2018 | Hiruta et al. | |
| 2018/0257683 | A1* | 9/2018 | Govindappa | B61L 27/57 |
| 2018/0268624 | A1* | 9/2018 | Remboski | B60W 50/0097 |
| 2020/0105072 | A1* | 4/2020 | Wisley | G05D 1/021 |
| 2021/0286925 | A1* | 9/2021 | Wyrwas | G06N 3/084 |
| 2023/0112050 | A1* | 4/2023 | Askeland | G07C 5/085<br>701/27 |
| 2023/0194281 | A1* | 6/2023 | Lane | G06Q 10/20 |
| 2024/0232460 | A1 | 7/2024 | Cruz et al. | |
| 2025/0315726 | A1* | 10/2025 | Ishii | G06N 20/00 |

OTHER PUBLICATIONS

International Search Report received in PCT Application No. PCT/JP2022/037008, dated Dec. 20, 2022.

* cited by examiner

DATA PROCESSING APPARATUS AND NON-TRANSITORY RECORDING MEDIUM

CROSS-REFERENCE TO RELATED APPLICATIONS

This application is continuation of International Application No. PCT/JP2022/037009, filed on Oct. 3, 2022, the entire contents of which are hereby incorporated by reference.

BACKGROUND

The disclosure relates to a data processing apparatus and a non-transitory recording medium. For example, the disclosure relates to a technical field of simulating a vehicle behavior using a vehicle model.

For a vehicle such as an automobile, there is a desire to customize settings related to motion performance based on a user's preference. For example, a user who has many opportunities to use a freeway may desire a setting that emphasizes straight line stability in a high-speed region and a smooth acceleration feeling, and a user who has many opportunities to travel on a winding road may desire a setting that has good response, an accelerator response, and convergence with respect to vibration. In these cases, examples of the setting may include suspension settings of wheel alignment, and acceleration/deceleration-related settings of an engine and a brake.

Japanese Patent No. 6825634 discloses a technique of predicting an occurrence of a malfunction, that is, predicting a malfunction of a component included in a vehicle that may occur at a future time, based on a result of a simulation of a vehicle behavior resulting from traveling of a digital twin vehicle on a server in a traveling environment reproduced in a virtual space.

SUMMARY

An aspect of the disclosure provides a data processing apparatus. The data processing apparatus includes one or more processors and one or more recording media. The one or more recording media includes a program to be executed by the one or more processors stored therein. The program includes one or more commands. The one or more commands are configured to cause the one or more processors to execute: a simulation process of performing, based on driving operation data of a vehicle, a simulation of a vehicle behavior of the vehicle using vehicle models having different parameter settings; and a model identifying process of identifying one or more of the vehicle models that satisfy a predetermined similarity condition by evaluating a similarity of a vehicle behavior of each of the vehicle models to be obtained in the simulation process with a target vehicle behavior, the target vehicle behavior being a vehicle behavior of the vehicle of interest. Evaluating the similarity in the model identifying process is based on a time waveform of the vehicle behavior obtained in the simulation process and a time waveform of the target vehicle behavior.

An aspect of the disclosure provides a non-transitory recording medium readable by a computer apparatus. The non-transitory recording medium causes the computer apparatus to execute a method. The method includes: simulating, based on driving operation data of a vehicle of interest, a vehicle behavior of the vehicle using vehicle models having different parameter settings; and identifying one or more of the vehicle models that satisfy a predetermined similarity condition by evaluating a similarity of a vehicle behavior of each of the vehicle models to be obtained in the simulating with a target vehicle behavior, the target vehicle behavior being a vehicle behavior of the vehicle of the interest. The evaluating the similarity is based on a time waveform of the vehicle behavior obtained in the simulating and a time waveform of the target vehicle behavior.

An aspect of the disclosure provides a data processing apparatus. The data processing apparatus includes one or more processors and one or more recording media. The one or more recording media includes a program to be executed by the one or more processors stored therein. The program includes one or more commands. The one or more commands are configured to cause the one or more processors to execute: a simulation process of performing, based on driving operation data of a vehicle, a simulation of a vehicle behavior of the vehicle using vehicle models having different parameter settings; and a model identifying process of identifying one or more of the vehicle models that satisfy a predetermined similarity condition by evaluating a similarity of a vehicle behavior of each of the vehicle models to be obtained in the simulation process with a target vehicle behavior, the target vehicle behavior being a vehicle behavior of the vehicle of interest. The vehicle models to be used in the simulation process include vehicle models each subjected to a parameter setting corresponding to a traveling road surface state of the vehicle estimated based on position data of the vehicle.

An aspect of the disclosure provides a non-transitory recording medium readable by a computer apparatus. The non-transitory recording medium causes the computer apparatus to execute a method. The method includes: simulating, based on driving operation data of a vehicle of interest, a vehicle behavior of the vehicle using vehicle models having different parameter settings; and identifying one or more of the vehicle models that satisfy a predetermined similarity condition by evaluating a similarity of a vehicle behavior of each of the vehicle models to be obtained in the simulating with a target vehicle behavior, the target vehicle behavior being a vehicle behavior of the vehicle of the interest. The vehicle models to be used in the simulating include vehicle models each subjected to a parameter setting corresponding to a traveling road surface state of the vehicle estimated based on position data of the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
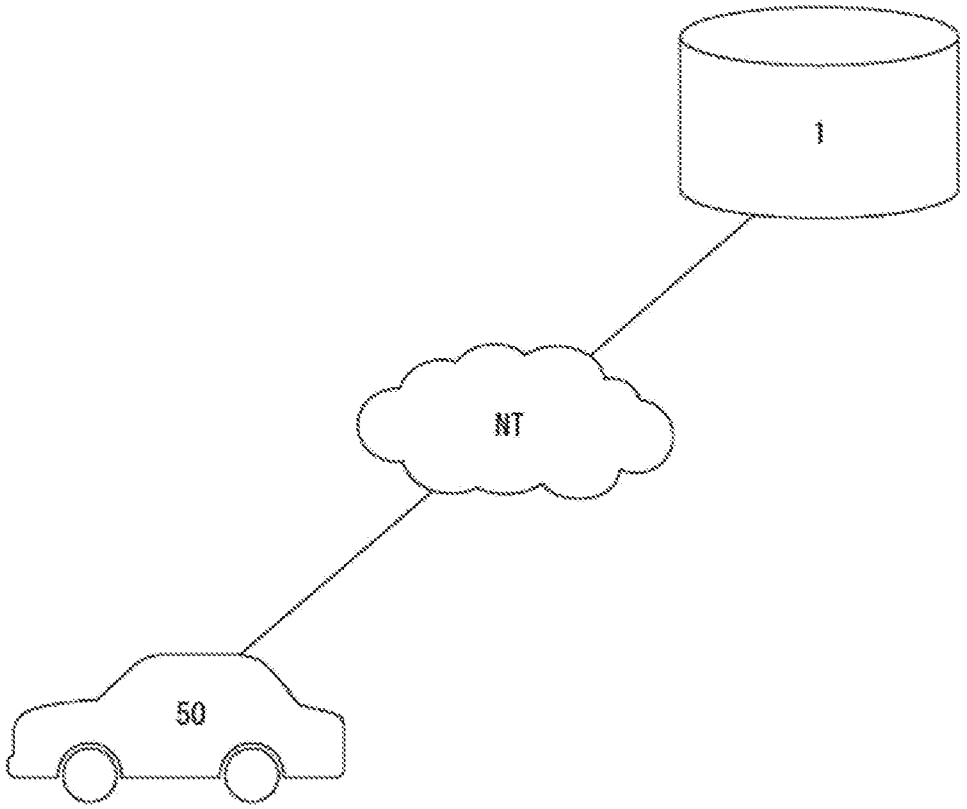
FIG. 1 is a diagram illustrating a configuration outline of a data processing system including a data processing apparatus according to one example embodiment of the disclosure.

To achieve a vehicle setting associated with a user's preference, it is conceivable to perform a work of finalizing a setting through trial and error in response to feedback from a user.

However, such a work can lead to a great human burden.

It is desirable to provide a data processing apparatus and a non-transitory recording medium that make it possible to reduce a work burden in achieving a vehicle setting associated with a user's preference.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any example embodiment of the disclosure are unillustrated in the drawings.

1. System Configuration

FIG. 1 is a diagram illustrating a configuration outline of a data processing system including a data processing apparatus according to an example embodiment of the disclosure.

The data processing system may include at least a server apparatus 1 and a vehicle 50. In one example embodiment, the server apparatus 1 may serve as the "data processing apparatus". The server apparatus 1 may include a computer apparatus including a CPU.

The vehicle 50 may include, for example, a four-wheel vehicle, and configured to travel using an engine or a motor as a drive source. The vehicle 50 according to the example embodiment may be provided with a computer apparatus configured to communicate with an external apparatus.

In this example, the vehicle 50 may be configured to perform data communication with the server apparatus 1 via a network NT serving as a communication network such as the Internet. This may allow the vehicle 50 to enter, into the server apparatus 1, various kinds of data such as driving operation data that is data indicating a driving operation on the vehicle 50.

Here, the entering of the data from the vehicle 50 into the server apparatus 1 may also be performed by means other than communication via the network NT. For example, the vehicle 50 and the server apparatus 1 may be coupled to each other via a wired connection, and wired communication may be performed to enter target data such as the driving operation data into the server apparatus 1 from the vehicle 50. Alternatively, the target data such as the driving operation data stored in the vehicle 50 may be inputted into the server apparatus 1 via a removable recording medium such as a USB (Universal Serial Bus) memory. In addition, the target data stored in the vehicle 50 may be transferred to a computer apparatus, examples of which include a smartphone and a PC (personal computer), of a user such as a driver who drives the vehicle 50, following which the target data may be entered into the server apparatus 1 from the computer apparatus via the network NT.

As described above, various methods of entering the data from the vehicle 50 into the server apparatus 1 may be conceivable, and any embodiment of the disclosure is not limited to a particular method.

Figure 2:
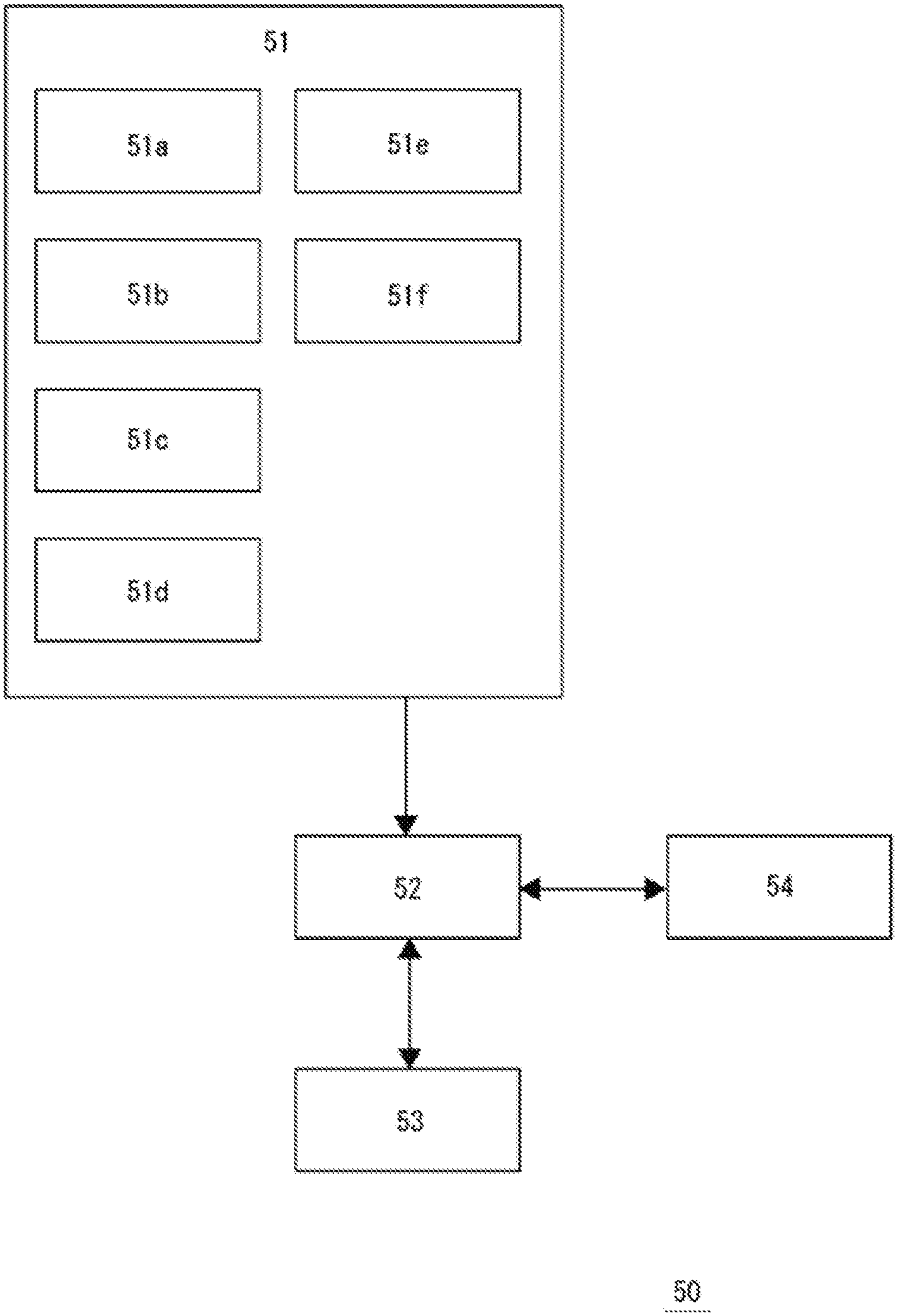
FIG. 2 is a block diagram illustrating a configuration example of a vehicle illustrated in FIG. 1.

FIG. 2 is a block diagram illustrating a configuration example of the vehicle 50. Note that, in FIG. 2, only electric components according to the example embodiment are extracted and illustrated out of components included in the vehicle 50.

As illustrated in FIG. 2, the vehicle 50 may include a sensor unit 51, a controller 52, a memory 53, and a communicator 54.

The sensor unit 51 may comprehensively illustrate various sensors included in the vehicle 50, particularly those related to the example embodiment.

As illustrated in FIG. 2, the sensor unit 51 may include a yaw rate sensor 51*a*, an acceleration sensor 51*b*, a vehicle attitude sensor 51*c*, a GNSS (Global Navigation Satellite System) sensor 51*d*, a steering wheel angle sensor 51*e*, and a wheel speed sensor 51*f*.

The yaw rate sensor 51*a* may detect a yaw rate of the vehicle 50. The acceleration sensor 51*b* may detect an acceleration (G) acting in a certain direction of the vehicle 50. In the example embodiment, the acceleration sensor 51*b* may be configured to detect at least a longitudinal G and a lateral G of the vehicle 50.

The vehicle attitude sensor 51*c* may detect an attitude of the vehicle 50. In one example, the vehicle attitude sensor 51*c* may detect an attitude in a roll direction (a roll angle) and an attitude in a pitch direction (a pitch angle).

The GNSS sensor 51*d* may detect a position on the earth of the vehicle 50.

The steering wheel angle sensor 51*e* may detect a turning angle of a steering wheel in the vehicle 50.

The wheel speed sensor 51*f* may detect a revolution speed of the wheels (four wheels in this example) of the vehicle 50.

The controller 52 may include a microcomputer that includes, for example, a CPU (Central Processing Unit), a ROM (Read Only Memory), and a RAM (Random Access Memory). The controller 52 may correspond to an ECU (Electronic Control Unit) that executes a process according to the example embodiment out of various ECUs included in the vehicle 50.

As illustrated in FIG. 2, the controller 52 may be coupled to the memory 53 and the communicator 54.

The memory 53 may be a nonvolatile storage device such as an HDD (Hard Disk Drive) or an SSD (Solid State Drive). The communicator 54 may be a communication device that performs, for example, network communication or inter-device communication based on a predetermined communication standard with an external apparatus of the vehicle 50 by wire or wirelessly.

The controller 52 may be configured to enter data detected by each of the above-described sensors included in the sensor unit 51. Further, the controller 52 may be configured to cause the memory 53 to store the data detected by each of the sensors that has been entered or to transmit the data to an external apparatus such as the server apparatus 1 via the communicator 54.

Figure 3:
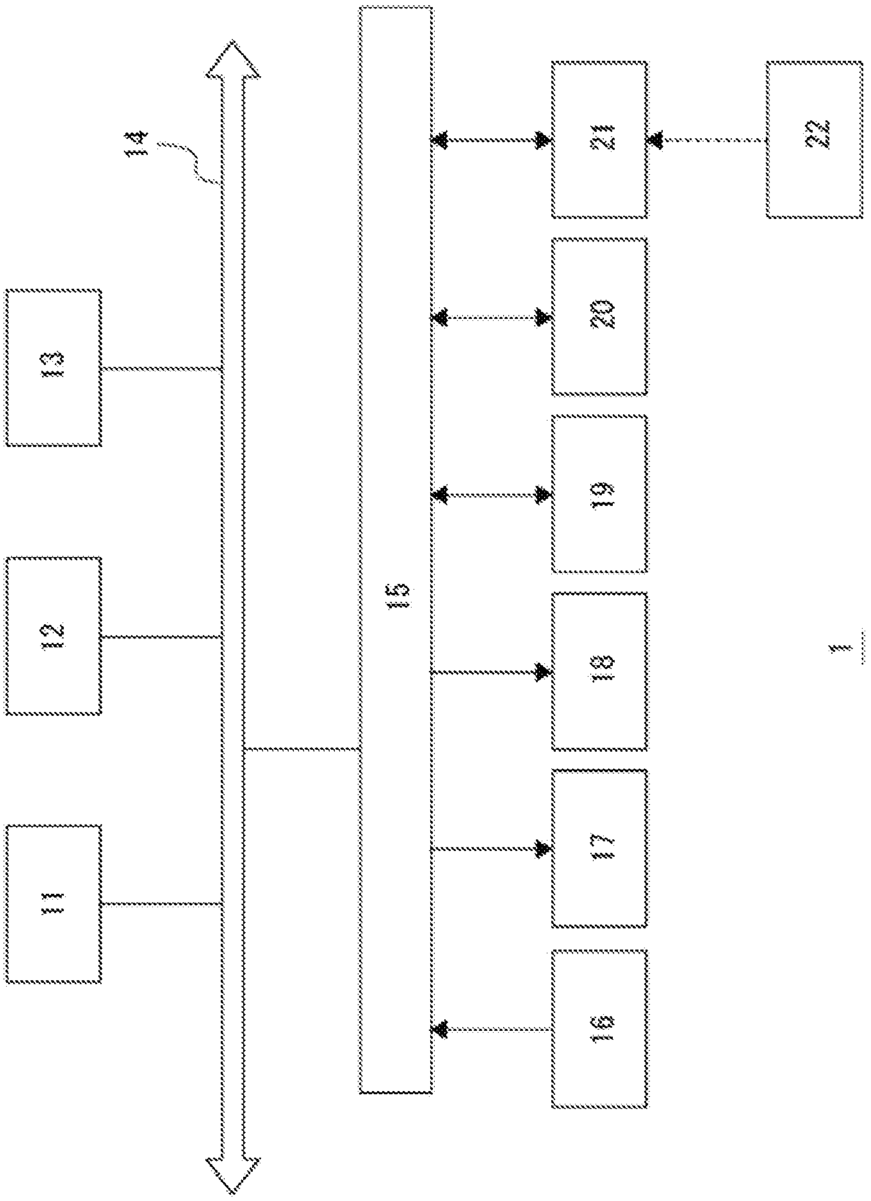
FIG. 3 is a block diagram illustrating a configuration example of the data processing apparatus illustrated in FIG. 1.

FIG. 3 is a block diagram illustrating a configuration example of the server apparatus 1.

As illustrated in FIG. 3, the server apparatus 1 may include a CPU 11. The CPU 11 may include a signal-processing unit including at least a CPU. The CPU 11 may serve as an arithmetic processing unit that executes various kinds of processes.

The CPU 11 may execute various processes in accordance with a program stored in a ROM 12 or a program loaded from a storage 19 to a RAM 13. The RAM 13 may also store, as appropriate, data necessary for the CPU 11 to execute various processes.

The CPU 11, the ROM 12, and the RAM 13 may be coupled to each other via a bus 14. To the bus 14, an input/output interface (I/F) 15 may also be coupled.

An input unit 16 including an operation element and an operation device may be coupled to the input/output interface 15. For example, assumed as the input unit 16 may be various operating elements and operating devices including, for example, a keyboard, a mouse, a key, a dial, a touch panel, a touch pad, and a remote controller.

A user operation may be detected by the input unit 16, and a signal corresponding to the entered operation may be interpreted by the CPU 11.

Further, a display 17 and an audio outputting unit 18 may be integrally or separately coupled to the input/output interface 15. The display 17 may include a display device configured to display an image, such as a LCD (Liquid Crystal Display) or an organic EL (Electro-Luminescence). The audio outputting unit 18 may include a speaker.

The display 17 may be used for various data displays. The display 17 may include, for example, a display device provided in a housing of the server apparatus 1 and a separate display device coupled to the server apparatus 1.

The display 17 may execute display of, for example, images for various kinds of image processing and moving images to be processed on a display screen, based on a command of the CPU 11. Further, the display 17 may perform display of, for example, various operation menus, icons, and messages, that is, a GUI (Graphical User Interface), based on the command of the CPU 11.

The storage 19 including, for example, an HDD and a solid-state memory, or a communicator 20 including a modem may be coupled to the input/output interface 15.

The communicator 20 may perform a communication process via a transmission path such as the Internet, wired/wireless communication with various devices, and communication such as bus communication.

Further, a drive 21 may be coupled to the input/output interface 15 as necessary, and a removable recording medium 22 such as a magnetic disk, an optical disc, a magneto-optical disk, or a semiconductor memory may be appropriately mounted.

The drive 21 may make it possible to read, for example, a data file such as a program to be used in each of the processes from the removable recording medium 22. The read data file may be stored in the storage 19, or an image and a sound included in the data file may be outputted by the display 17 or the audio outputting unit 18. For example, the computer program read from the removable recording medium 22 may be installed in the storage 19 as necessary.

The server apparatus 1 having the above-described hardware configuration may be configured to install, for example, software to be used for the processes of the example embodiment via network communication by the communicator 20 or via the removable recording medium 22. Alternatively, the software may be stored in advance in, for example, the ROM 12 or the storage 19.

The CPU 11 may perform the processes based on various programs, thereby executing a data process and a communication process that are necessary for the server apparatus 1 to be described later.

2. Setting Identifying Method According to Example Embodiment

Figure 4:
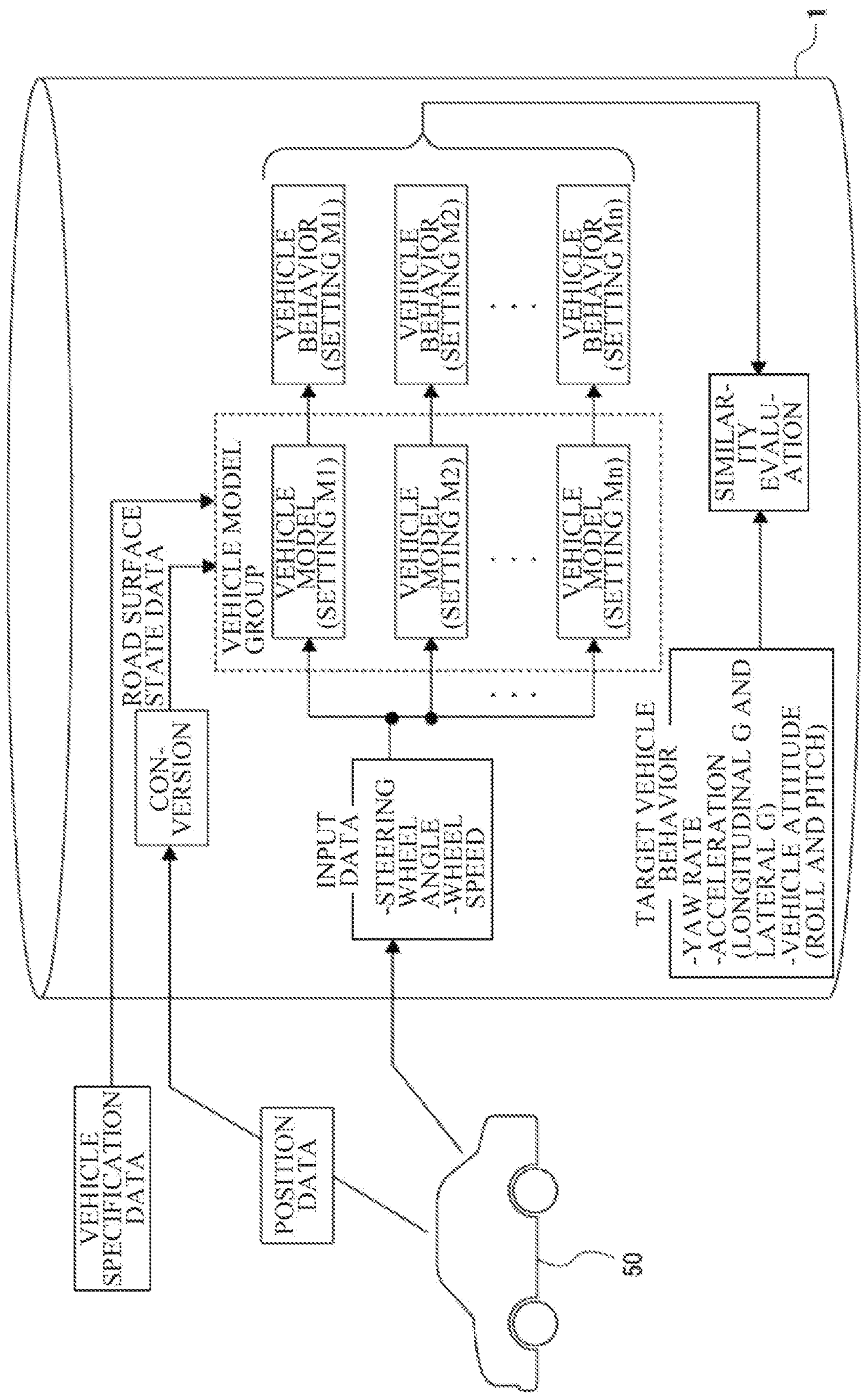
FIG. 4 is a diagram for describing a setting identifying method according to one example embodiment.

Referring to FIG. 4, a setting identifying method according to the example embodiment will be described.

In identifying a setting of the vehicle 50 associated with the user's preference in the example embodiment, the server apparatus 1 may prepare multiple vehicle models illustrated as a vehicle model group in FIG. 4. The vehicle model here may be a vehicle model in a digital twin technique, and mean a calculation model configured to reproduce a vehicle behavior with respect to a driving operation.

In the example embodiment, prepared as the multiple vehicle models may be vehicle models subjected to parameter settings corresponding to different vehicle settings. Examples of the vehicle settings here may include suspension settings of wheel alignment and tire pressure, and acceleration/deceleration-related settings of an engine and a brake.

Note that the example assumes to identify the suspension setting associated with the user's preference, as will be described later. Accordingly, in this example, vehicle models having different vehicle settings related to suspension may be prepared as multiple vehicle models to serve as the vehicle model group.

When the number of assumed vehicle settings is "n" from a setting S1 to a setting Sn, n-number of vehicle models corresponding to the respective vehicle settings may be prepared as the vehicle models, as illustrated in FIG. 4.

In this case, for each vehicle model to be used as the vehicle model group, a vehicle specification data for the vehicle 50, that is, a parameter corresponding to data of, for example, a size (such as a total width, a total length, a total height, or a wheelbase) and a weight of the vehicle 50 may be set. This may allow the vehicle behavior of the vehicle 50 to be appropriately simulated.

Here, in identifying the vehicle setting associated with the user's preference, driving operation data of the vehicle 50 may be entered into the server apparatus 1 as input data with respect to the vehicle model. As the driving operation data serving as the input data, data of a steering wheel angle and data of a wheel speed may be entered from the vehicle 50 into the server apparatus 1 in this example.

The data of the wheel speed may be entered as data corresponding to the driving operation as an accelerator operation and a brake operation of the vehicle 50. For the wheel speed, when what is called a two-wheel model is used as the vehicle model, data detected for at least two corresponding wheels may be entered.

This example may assume to identify the suspension setting as the setting associated with the user's preference. Accordingly, as the driving operation data, only the data of the steering wheel angle may be entered together with the data of the wheel speed.

Note that, for example, when the vehicle setting related to the acceleration of the vehicle 50 is to be identified, data indicating an accelerator opening degree or a throttle angle sensor may be included as the input data (the driving operation data). When the vehicle setting related to the deceleration of the vehicle 50 is to be identified, data indicating a depression amount of the brake may be included as the input data.

For example, the data of the steering wheel angle and the data of the wheel speed that are included in the driving operation data may be respectively detected by the steering wheel angle sensor 51*e* and the wheel speed sensor 51*f*.

In identifying the vehicle setting associated with the user's preference, data of the target vehicle behavior that is the vehicle behavior of the vehicle 50 of interest may be prepared. Prepared as the data of the target vehicle behavior may be, for example, when the user desires, i.e., sets as a target, a vehicle setting in which the straight line stability in a high-speed region is favorable, the data of the vehicle behavior based on when the straight line stability in the high-speed region is favorable.

For example, data of the vehicle behavior that the user has felt favorable when the user experiences a virtual driving experience with a driving simulator may be used as the data of the target vehicle behavior.

In this example, prepared as the data of the target vehicle behavior may be, as illustrated in the FIG. 4, the yaw rate, the acceleration (the longitudinal G and the lateral G), and the vehicle attitude (the roll and the pitch).

Note that what data is to be used as the data of the target vehicle behavior should be determined according to what vehicle setting is to be identified, and is not limited to data exemplified above.

Here, in this example, the server apparatus 1 may receive position data of the vehicle 50 that the vehicle 50 detects with use of the GNSS sensor 51*d*. In one example, as the position data, data indicating a position of the vehicle 50 may be entered. The position of the vehicle 50 may be based on when the driving operation indicated by the driving operation data to be entered into the vehicle model is performed.

The server apparatus 1 may perform a process of converting the position data into road surface state data indicating a traveling road surface state of the vehicle 50 at a stage prior to executing a simulation with use of each vehicle model. For example, the conversion process may be performed using a database indicating a correspondence relation between the position data and the traveling road surface state.

Thereafter, the server apparatus 1 may perform parameter setting corresponding to the road surface state data obtained by the above-described conversion process on each vehicle model.

Accordingly, the simulation of the vehicle behavior based on the driving operation data of the vehicle 50 may be performed using the vehicle model subjected to the parameter setting corresponding to the traveling road surface state of the vehicle.

This makes it possible to perform the simulation of the vehicle behavior reflecting an actual traveling road surface state of the vehicle 50, and improve a simulation accuracy of the vehicle behavior using each vehicle model.

As the road surface state, a wet road surface and a dry road surface may be distinguished, for example. In such a case, not only the position data of the vehicle 50 but also a parameter corresponding to a traveling road surface state estimated based on weather data in the position indicated by the position data may be set to each vehicle model.

The server apparatus 1 may use the driving operation data entered from the vehicle 50, the data of the target vehicle behavior, and the multiple vehicle models to identify the vehicle setting associated with the user's preference as follows.

For example, by being provided with the driving operation data as the input data of each vehicle model, the server apparatus 1 may simulate the vehicle behavior for each vehicle model (that is, for each vehicle setting). A result of the simulation of the vehicle behavior for each vehicle setting may be thereby obtained as illustrated in FIG. 4.

In this example, each vehicle model may be configured to output, as the data indicating the vehicle behavior, data similar to the data of the target vehicle behavior, for example, at least the data of the yaw rate, the acceleration (the longitudinal G and the lateral G), and the vehicle attitude (the roll and the pitch).

In this case, when the target desired by the user is a target aimed at a traveling scene at a particular location, for example, "the user desires to make the straight line stability in the high-speed region to be favorable", used as the data of the target vehicle behavior may be the data of the yaw rate, the acceleration, and the vehicle attitude in such a traveling scene. Accordingly, the driving operation data obtained in such a traveling scene may also be used as the driving operation data to be entered into each vehicle model.

In one example, when the target vehicle behavior based on the case of "the user desires to make the straight line stability in the high-speed range to be favorable" is set, used as the driving operation data to be entered into each vehicle model may be, for example, the driving operation data in the high-speed traveling scene such as a time of traveling on an expressway.

The server apparatus 1 performs a process of evaluating a similarity of the vehicle behavior of each vehicle model obtained by the simulation using the multiple vehicle models as described above with the target vehicle behavior, and identifying the vehicle model that satisfies a predetermined similarity condition.

This example may use the data of the yaw rate, the acceleration, and the vehicle attitude out of pieces of data of the vehicle behavior obtained using each vehicle model in evaluating similarity, in correspondence with the use of the data of the yaw rate, the acceleration, and the vehicle attitude as the data of the target vehicle behavior as described above. For example, the kinds of vehicle behavior data to be used for evaluating similarity are matched.

In the example embodiment, as the driving operation data and the data of the target vehicle behavior, it may be assumed that data (time-series sampled data) of a time waveform in a certain period of, for example, several minutes or several tens of seconds, is used. The server apparatus 1 may evaluate the similarity based on a time waveform of the vehicle behavior obtained in the simulation process using the vehicle model and a time waveform of the target vehicle behavior.

In one example, the server apparatus 1 in this example may calculate, in evaluating the similarly of the simulated vehicle behavior with respect to the target vehicle behavior, a degree of similarity Sv between the two vehicle behaviors. The degree of similarity Sv may be calculated, for example, as a sum of correlation values (1 being the largest value=highest correlation) calculated using a cross-correlation function for respective time waveforms of the yaw rates, the longitudinal Gs, the lateral Gs, the roll angles, and the pitch angles of both the simulated vehicle behavior and the target vehicle behavior. In this case, there are five kinds of time waveforms to be evaluated, and thus a maximum value of the degree of similarity Sv is "5".

The server apparatus 1 may identify the vehicle model in which the degree of similarity calculated as described above is greater than or equal to a predetermined threshold TH. In other words, the server apparatus 1 may identify the vehicle model in which the degree of similarity of the vehicle behavior obtained as the result of the simulation with respect to the target vehicle behavior is high.

Performing such a process of identifying the vehicle model identifies the vehicle setting in which the vehicle behavior that is similar to the target vehicle behavior is obtainable, that is, the vehicle setting associated with the user's preference.

When the server apparatus 1 identifies the vehicle setting associated with the user's preference by the above-described processes, the server apparatus 1 may perform a process of notifying a notification target such as a user of the identified vehicle setting. Further, when the server apparatus 1 determines that the vehicle setting in which the degree of similarity Sv is greater or equal to the threshold TH is absent and that the vehicle setting associated with the user's preference is absent, the server apparatus 1 may perform a process of notifying the notification target of data indicating the absence.

The notification may be performed via, for example, a computer apparatus such as a smartphone or a PC used by the user of the vehicle 50, or a computer apparatus disposed in a maintenance facility of a dealer, for example. Alternatively, if the vehicle 50 is communicably coupled to the server apparatus 1, the notification may be performed via a display provided in the vehicle 50.

4. Procedure

Referring to a flowchart of FIG. 5, an example procedure for achieving a setting identifying method according to the example embodiment described above will be described.

Figure 5:
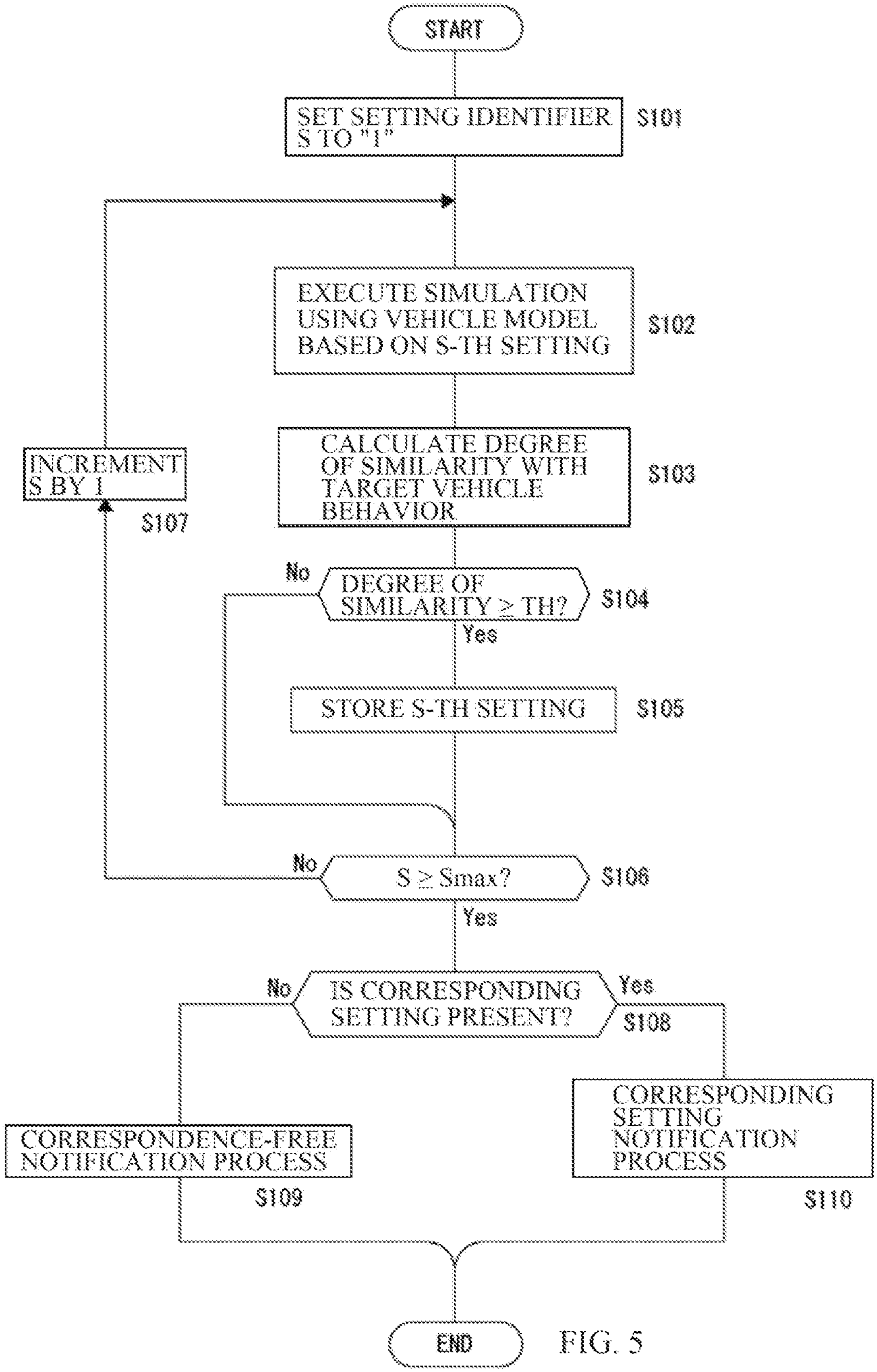
FIG. 5 is a flowchart illustrating an example of a procedure for achieving the setting identifying method illustrated in FIG. 4.

The process illustrated in FIG. 5 may be executed by the CPU 11 of the server apparatus 1 in accordance with a program stored in a predetermined storage device such as the ROM 12 or the storage 19.

In this example, upon starting the process illustrated in FIG. 5, it may be assumed that the driving operation data have already been entered from the vehicle 50 into the server apparatus 1.

It may also be conceivable to execute the process illustrated in FIG. 5 using the driving operation data entered in real time from the vehicle 50. In that case, when the target vehicle behavior aimed at a traveling scene at a particular location, for example, "the user desires to make the straight line stability in the high-speed region to be favorable", is set, whether the current time corresponds to the relevant traveling scene may be determined based on data of position data of the vehicle 50, and the process of FIG. 5 may be started in response to the determination that the current time corresponds to the relevant traveling scene, for example.

In FIG. 5, the CPU 11 may perform a process of setting a setting identifier S to "1" in step S101. The setting identifier S is an identifier for identifying the setting to be processed out of the settings S1 to Sn.

In step S102 following step S102, the CPU 11 may execute the simulation using the vehicle model of the S-th setting. For example, the CPU 11 may execute the simulation of the vehicle behavior that is provided with, as the input data, the driving operation data entered from the vehicle 50 into the vehicle model subjected to the parameter setting corresponding to the S-th setting.

In step S103 following step S102, the CPU 11 may calculate the degree of similarity Sv with the target vehicle behavior. In the subsequent step S104, the CPU 11 may determine whether the degree of similarity Sv is greater than or equal to the threshold TH.

In step S104, if the CPU 11 determines that the degree of similarity Sv is greater than or equal to the threshold TH (Step S104: Yes), the CPU 11 may proceed to step S105 and perform a process of storing the S-th setting, that is, a process of causing the predetermined storage device such as the RAM 13 or the storage 19 to store data indicating the S-th setting.

Thereafter, the process may proceed to step S106.

If the CPU 11 determines in step S104 that the degree of similarity Sv is not greater than or equal to the threshold TH (Step S104: No), the CPU 11 may pass the storage process of step S105 and proceed to step S106.

In step S106, the CPU 11 may determine whether the setting identifier S is greater than or equal to a maximum value Smax. Here, the maximum value Smax may be "n".

In step S106, if the CPU 11 determines that the setting identifier S is not greater than or equal to the maximum value Smax (that is, when the number of settings that have been processed is less than n) (Step S106: No), the CPU 11 may proceed to step S107 to increment the setting identifier S by 1, and return to step S102. In this manner, a process for the subsequent setting may be performed.

If the CPU 11 determines in step S106 that the setting identifier S is greater than or equal to the maximum value Smax (Step S106: Yes), the CPU 11 may proceed to step S108 and determine whether a corresponding setting is present. For example, the CPU 11 may determine whether the setting in which the degree of similarity Sv is determined to be greater than or equal to the threshold TH in the process of step S104 is present.

In step S108, if the CPU 11 determines that the corresponding setting is not present (Step S108: No), the CPU 11 may proceed to step S109 and execute a correspondence-free notification process. That is, the CPU 11 may execute the process of notifying the notification target such as the user of the data indicating the absence of the vehicle setting associated with the user's preference.

In step S108, if the CPU 11 determines that the corresponding setting is present (Step S108: Yes), the CPU 11 may proceed to step S110 and execute a corresponding setting notification process. That is, the CPU 11 may execute the process for notifying the notification target such as the user of the data indicating the setting stored in the storage process of the preceding step S105.

The CPU 11 may end the series of processes illustrated in FIG. 5 in response to the execution of the process of step S108 or step S109.

Note that in the above description, the simulation using the vehicle model (S102), the calculation of the degree of similarity Sv (S103), and the similarity determination based on the degree of similarity Sv (S104) are executed separately for each vehicle setting (for each vehicle model).

Alternatively, it may also be possible to collectively execute the simulations using the multiple vehicle models to obtain the vehicle behaviors for the respective vehicle settings, and thereafter perform the calculation of the degree of similarity Sv (S103) and the similarity determination based on the degree of similarity Sv (S104) for each of the vehicle behaviors.

5. Modification

The example embodiment of the disclosure has been described above; however, the disclosure may not be limited to the examples described above, and various configurations may be adopted as modifications.

For example, in the above description, the example is given of performing the determination of whether the degree of similarity Sv is greater than or equal to the threshold TH, as the determination of whether the vehicle behavior obtained by the simulation using the vehicle model and the target vehicle behavior satisfy the predetermined similarity condition (hereinafter, referred to as "vehicle behavior similarity determination"). However, a specific method of the vehicle behavior similarity determination may be variously conceivable, and may not be limited to the identifying method.

For example, the vehicle behavior similarity determination may be performed using an AI (artificial intelligence) for determination. In this case, as the AI for the determination, the AI obtained by machine learning in such a manner as to output a similar/dissimilar determination result based on the target vehicle behavior and the vehicle behavior simulated using the vehicle model as the input data may be used. Alternatively, the AI obtained by machine learning in such a manner as to output a value indicating the degree of similarity based on the target vehicle behavior and the vehicle behavior simulated using the vehicle model as the input data may be used.

Further, although it has been described above that the identified vehicle setting is notified to, for example, the user, a receiver of the notification of the vehicle setting may cause the user to experience the vehicle behavior that have been changed to the notified vehicle setting by the driving simulator.

The simulation of the vehicle behavior using the vehicle model and the vehicle behavior similarity determination may be performed separately for each traveling mode of the vehicle 50. Examples of the traveling mode may include during straight traveling of the vehicle 50 and during turning of the vehicle 50.

6. Conclusion of Example Embodiment

As described above, the data processing apparatus (the server apparatus 1 in one embodiment) according to the example embodiment includes one or more processors (the CPU 11 in one embodiment), and one or more recording media (the ROM 12 or the storage 19 in one embodiment) having a program to be executed by the one or more processors stored therein. The program includes one or more commands. The commands are configured to cause the one or more processors to execute the following example processes.

For example, the processes to be executed are: a simulation process of performing, based on driving operation data of a vehicle (the vehicle 50), a simulation of a vehicle behavior of the vehicle using multiple vehicle models having different parameter settings; and a model identifying process of identifying one or more of the vehicle models that satisfy a predetermined similarity condition by evaluating a similarity of a vehicle behavior of each of the vehicle models to be obtained in the simulation process with a target vehicle behavior, the target vehicle behavior being a vehicle behavior of the vehicle of interest. Evaluating the similarity in the model identifying process is based on a time waveform of the vehicle behavior obtained in the simulation process and a time waveform of the target vehicle behavior.

With this configuration, the preparation of the vehicle models subjected to the parameter settings corresponding to different vehicle settings as the multiple vehicle models allows the vehicle setting for achieving the target vehicle behavior to be identified by the identification of the vehicle model in the model identifying process. Accordingly, it is possible to identify the vehicle setting for achieving the target vehicle behavior without manually performing the work of finalizing the vehicle setting.

It is therefore possible to reduce a work burden in achieving the vehicle setting associated with the user's preference.

In some embodiments, the multiple vehicle models to be used in the simulation process may include vehicle models subjected to respective parameter settings corresponding to different vehicle settings.

Accordingly, the setting for achieving the target vehicle behavior is identified by performing the identification of the vehicle model in the model identifying process.

It is therefore possible to reduce a work burden in achieving the vehicle setting associated with the user's preference.

In some embodiments, the multiple vehicle models to be used in the simulation process may include vehicle models each subjected to a parameter setting corresponding to a traveling road surface state of the vehicle estimated based on position data of the vehicle.

This makes it possible to perform the simulation of the vehicle behavior reflecting the actual traveling road surface state of the vehicle.

It is therefore possible to improve the simulation accuracy of the vehicle behavior, and to improve the identification accuracy of the vehicle setting associated with the user's preference.

In some embodiments, evaluating the similarity in the model identifying process may be based on a time waveform of the vehicle behavior obtained in the simulation process and a time waveform of the target vehicle behavior.

This allows the similarity evaluation between the simulated vehicle behavior and the target vehicle behavior to be performed based on the correlation over time, rather than the temporal correlation of both behaviors.

It is therefore possible to improve accuracy of the similarity evaluation.

The non-transitory recording medium according to the example embodiment is a non-transitory recording medium readable by a computer apparatus. The non-transitory recording medium causes the computer apparatus to execute a method. The method includes: simulating, based on driving operation data of a vehicle of interest, a vehicle behavior of the vehicle using multiple vehicle models having different parameter settings; and identifying one or more of the vehicle models that satisfy a predetermined similarity condition by evaluating a similarity of a vehicle behavior of each of the vehicle models to be obtained in the simulating with a target vehicle behavior, the target vehicle behavior being a vehicle behavior of the vehicle of the interest. The evaluating the similarity is based on a time waveform of the vehicle behavior obtained in the simulating and a time waveform of the target vehicle behavior.

With such a non-transitory recording medium, it is possible to cause the computer apparatus to function as the data processing apparatus according to the example embodiment described above.

Although some example embodiments of the disclosure have been described in the foregoing by way of example with reference to the accompanying drawings, the disclosure is by no means limited to the example embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The CPU 11 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 11 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 11 illustrated in FIG. 3.

The invention claimed is:

1. A data processing apparatus comprising:

one or more processors; and one or more recording media comprising a program to be executed by the one or more processors stored therein, wherein the program comprises one or more commands, the one or more commands are configured to cause the one or more processors to execute:

a simulation process of performing, based on driving operation data of a vehicle of interest, a simulation of a vehicle behavior of the vehicle of interest using a plurality of vehicle models of the vehicle of interest, each of the plurality of vehicle models being subjected to a parameter setting corresponding to a different vehicle setting of the vehicle of interest; and a model identifying process of, for each of the plurality of vehicle models, evaluating a similarity between a time waveform of the vehicle behavior obtained in the simulation process using a corresponding one of the plurality of vehicle models and a time waveform of a target vehicle behavior, the target vehicle behavior being a vehicle behavior of the vehicle of interest, and identifying, from among the plurality of vehicle models, one or more of the plurality of vehicle models that satisfy a predetermined similarity condition based on the evaluated similarity.

2. The data processing apparatus according to claim 1, wherein the vehicle setting includes at least one of:

a suspension setting including a wheel alignment setting or a tire pressure setting; or an acceleration or deceleration related setting of an engine or a brake.

3. The data processing apparatus according to claim 1, wherein each of the plurality of vehicle models of the vehicle of interest is further subjected to a parameter setting corresponding to a traveling road surface state of the vehicle of interest estimated based on position data of the vehicle.

4. The data processing apparatus according to claim 1, wherein the evaluating of the similarity comprises calculating a degree of similarity by:

calculating, using a cross-correlation function, correlation values for respective time waveforms of a yaw rate, a longitudinal acceleration, a lateral acceleration, a roll angle, and a pitch angle included in the vehicle behavior obtained in the simulation process and the target vehicle behavior; and summing the correlation values, and wherein the model identifying process is configured to identify the one or more of the plurality of vehicle models as the vehicle models for which the degree of similarity is greater than or equal to a predetermined threshold.

5. A non-transitory recording medium readable by a computer apparatus, the non-transitory recording medium causing the computer apparatus to execute a method, the method comprising:

simulating, based on driving operation data of a vehicle of interest, a vehicle behavior of the vehicle of interest using a plurality of vehicle models of the vehicle of interest, each of the plurality of vehicle models being subjected to a parameter setting corresponding to a different vehicle setting of the vehicle of interest; and for each of the plurality of vehicle models, evaluating a similarity between a time waveform of the vehicle behavior obtained in the simulating of the vehicle behavior using a corresponding one of the plurality of vehicle models and a time waveform of a target vehicle behavior, the target vehicle behavior being a vehicle behavior of the vehicle of interest, and identifying, from among the plurality of vehicle models, one or more of the plurality of vehicle models that satisfy a predetermined similarity condition based on the evaluated similarity.

6. A data processing apparatus comprising:

one or more processors; and one or more recording media comprising a program to be executed by the one or more processors stored therein, wherein the program comprises one or more commands, the one or more commands are configured to cause the one or more processors to execute:

a simulation process of performing, based on driving operation data of a vehicle of interest, a simulation of a vehicle behavior of the vehicle of interest using a plurality of vehicle models of the vehicle of interest, each of the plurality of vehicle models being subjected to a parameter setting corresponding to a different vehicle setting of the vehicle of interest and to a parameter setting corresponding to a traveling road surface state of the vehicle of interest estimated based on position data of the vehicle of interest, and a model identifying process of, for each of the plurality of vehicle models, evaluating a similarity between a time waveform of the vehicle behavior obtained in the simulation process using a corresponding one of the plurality of vehicle models and a time waveform of a target vehicle behavior, the target vehicle behavior being a vehicle behavior of the vehicle of interest, and identifying, from among the plurality of vehicle models, one or more of the plurality of vehicle models that satisfy a predetermined similarity condition based on the evaluated similarity.

7. The data processing apparatus according to claim 6, wherein the vehicle setting includes at least one of:

a suspension setting including a wheel alignment setting or a tire pressure setting; or an acceleration or deceleration related setting of an engine or a brake.

8. The data processing apparatus according to claim 6, wherein evaluating the similarity in the model identifying process comprises calculating a degree of similarity by:

calculating, using a cross-correlation function, correlation values for respective time waveforms of a yaw rate, a longitudinal acceleration, a lateral acceleration, a roll angle, and a pitch angle included in the vehicle behavior obtained in the simulation process and in the target vehicle behavior; and summing the correlation values, and wherein the model identifying process is configured to identify the one or more of the plurality of vehicle models as the vehicle models for which the degree of similarity is greater than or equal to a predetermined threshold.

9. A non-transitory recording medium readable by a computer apparatus, the non-transitory recording medium causing the computer apparatus to execute a method, the method comprising:

simulating, based on driving operation data of a vehicle of interest, a vehicle behavior of the vehicle of interest using a plurality of vehicle models of the vehicle of interest, each of the plurality of vehicle models being subjected to a parameter setting corresponding to a different vehicle setting of the vehicle of interest and to a parameter setting corresponding to a traveling road surface state of the vehicle of interest estimated based on position data of the vehicle of interest; and for each of the plurality of vehicle models, evaluating a similarity between a time waveform of the vehicle behavior obtained in the simulating of the vehicle behavior using a corresponding one of the plurality of vehicle models and a time waveform of a target vehicle behavior, the target vehicle behavior being a vehicle behavior of the vehicle of interest, and identifying, from among the plurality of vehicle models, one or more of the plurality of vehicle models that satisfy a predetermined similarity condition based on the evaluated similarity.

* * * * *